Patented Nov. 28, 1950

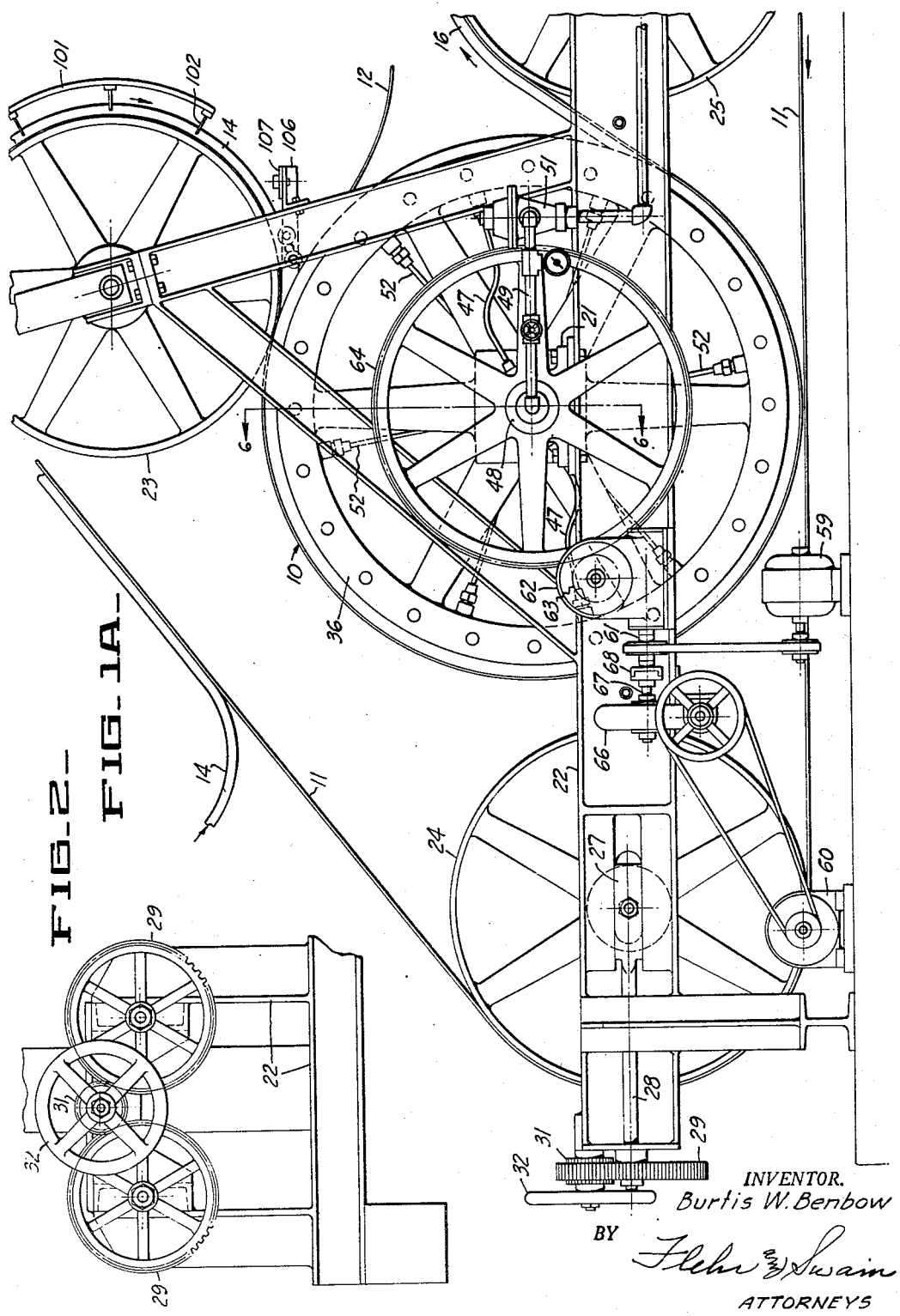

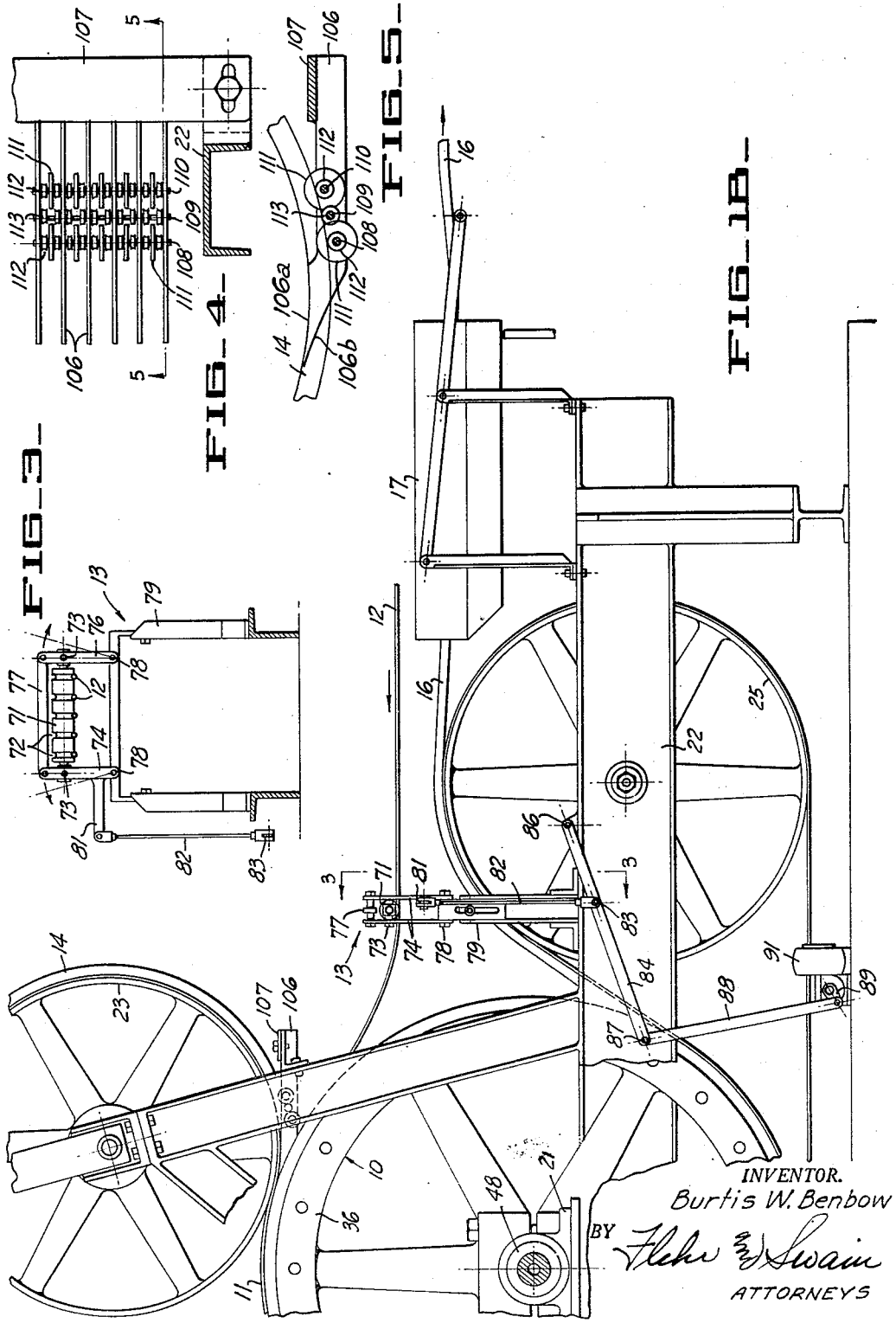

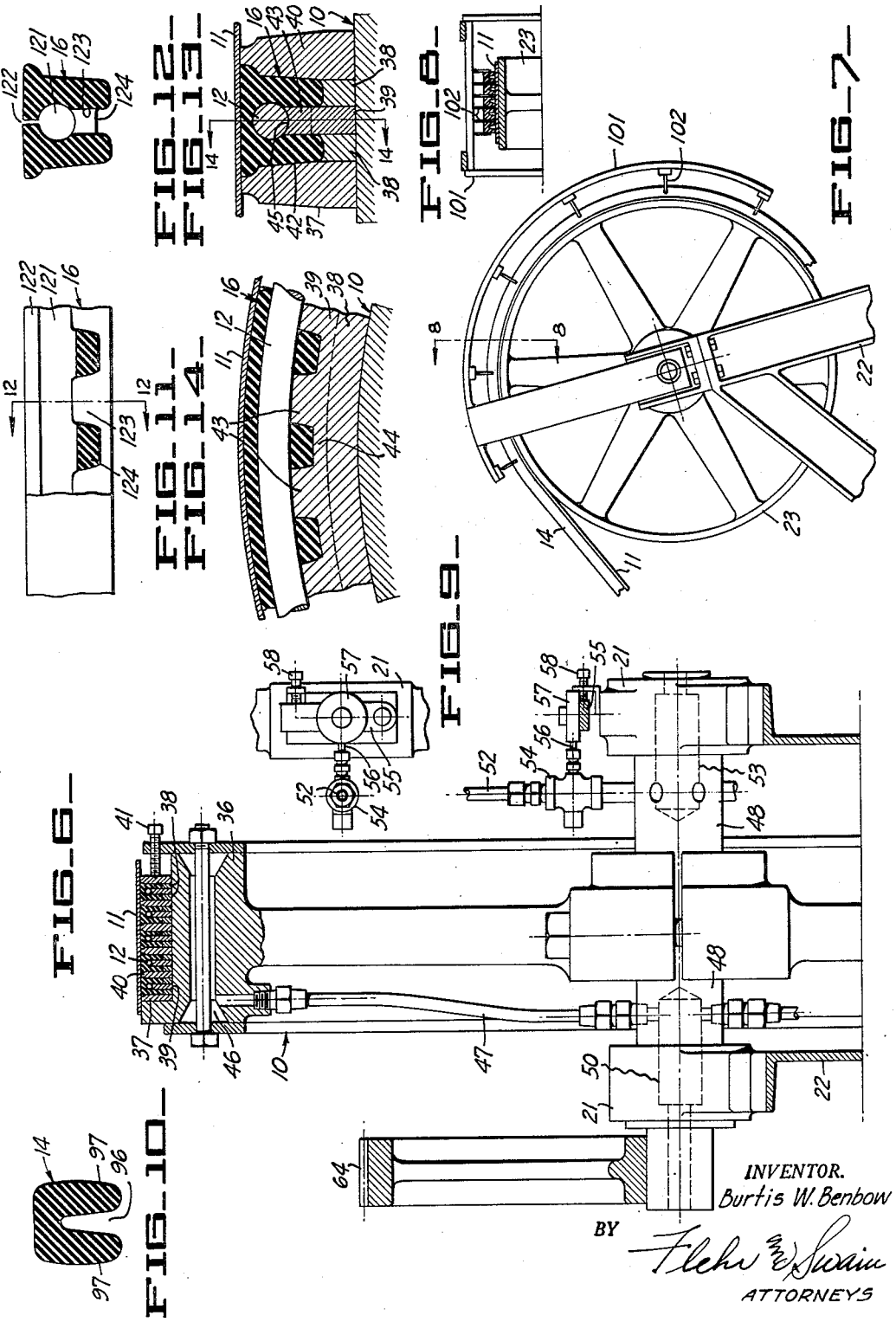

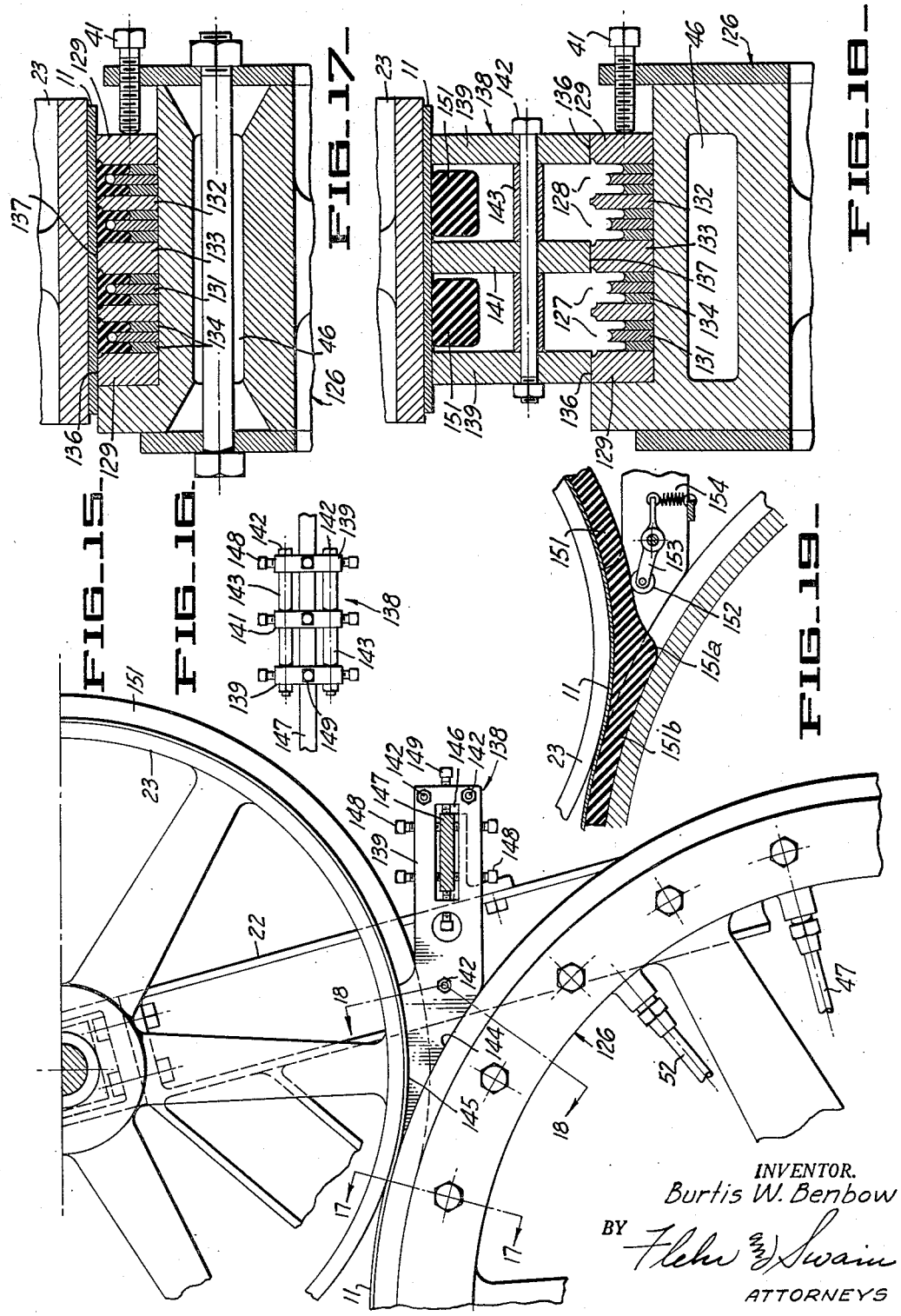

2,532,080

UNITED STATES PATENT OFFICE 2,532,080

APPARATUS FOR CONTINUOUSLY VULCANIZING RUBBER STRIP MATERIAL

Burtis W. Benbow, Benbow, Calif.

Application August 16, 1947, Serial No. 769,001

6 Claims. (Cl. 18—6)

This invention relates generally to machines for continuously molding products as material like resilient natural or synthetic rubber. The present application is a continuation in part of subject matter disclosed in my co-pending application Serial No. 568,999, filed December 20, 1944, for Molding Machine, now Patent No. 2,440,598; and which in turn is a continuation in part of my application Serial No. 460,512, filed October 2, 1942, now abandoned.

In general it is an object of the present invention to provide a machine capable of carrying out molding operations continuously, and which will enable quantity production of molded products with a minimum amount of labor.

A further object of the invention is to provide a molding machine capable of producing a continuous insulating sheath of the type disclosed in my Patent No. 2,255,874.

Another object of the invention is to provide an improved machine of the above character having means for supplying a length of rubber stock to a molding cavity, whereby all parts of the cavity will be completely filled.

Further objects of the invention will appear from the following description in which the preferred embodiment has been set forth in detail in conjunction with the accompanying drawing.

Referring to the drawing:

Figures 1A and 1B, taken together from left to right, illustrate the machine in side elevation.

Figure 2 is an end elevation showing means for adjusting the tension upon the endless metal belt employed.

Figure 3 is an enlarged detail illustrating means for oscillating the wire as it is sent to the molding cavity.

Figure 4 is a plan view, on an enlarged scale, showing the nozzle means employed for feeding the rubber stock into the molding cavity.

Figure 5 is a cross-sectional view taken along the line 5—5 of Figure 4.

Figure 6 is a cross-sectional detail taken on an enlarged scale, showing the construction of the molding wheel.

Figure 7 is a side elevational view, showing the upper pulley wheel of Figure 1A together with parts associated with the same.

Figure 8 is a cross-sectional detail taken along the line 8—8 of Figure 7.

Figure 9 is a detail showing means for operating the condensate valves.

Figure 10 is an enlarged cross-sectional detail showing one type of rubber stock which can be used.

Figure 11 is a side elevational view partly in section showing the finished molded product.

Figure 12 is a cross-sectional view taken along the line 12—12 of Figure 11.

Figure 13 is an enlarged cross-sectional detail showing the manner in which the metal band serves to confine the rubber in the molding cavity during the curing operation.

Figure 14 is a cross-sectional view taken along the line 14—14 of Figure 13.

Figure 15 is an enlarged detail showing a modified type of nozzle.

Figure 16 is a detail looking toward the exterior end of the nozzle of Figure 15 and showing the manner in which the nozzle is secured to a fixed support.

Figure 17 is an enlarged cross-sectional detail taken along the line 17—17 of Figure 15.

Figure 18 is an enlarged cross-sectional detail taken along the line 18—18 of Figure 15.

Figure 19 is a side elevational view in section, diagrammatically illustrating the manner in which the rubber stock is fed into the molding cavity.

That form of the machine illustrated in Figures 1 to 14 inclusive of the drawing consists of a molding wheel 10 which is rotated at a predetermined speed, and which has an endless band 11 applied under tension to a portion of its periphery. A wire or cable 12 about which the sheath is molded is applied to the molding wheel, after passing through an oscillating mechanism 13. Preformed rubber stock 14 is supplied to the molding wheel 10, and is pressed into the molding cavity to form a sheath of the desired shape. The sheath 16 is withdrawn from the molding wheel, and after being chilled by passing through device 17, is handled in a manner to be presently described.

To describe the machine in greater detail, molding wheel 10 has suitable journals or bearing blocks 21 for journaling the same on the main frame 22. The endless metal belt 11, which tracks upon a portion of the periphery of the molding wheel, also engages the pulley wheels 23, 24 and 25. Wheels 23 and 25 have fixed journals to the main frame, while wheel 24 is journaled upon the sliding bearing blocks 27. As suitable means for adjusting blocks 27, threaded rods 28 extend rearwardly from these blocks, and are engaged by nuts, which in turn are carried by the gear wheels 29. These gears are engaged by a common pinion 31 which in turn is operated by the hand wheel 32. Thus by turning this hand wheel the tension upon the endless belt 11 can be varied.

It will be noted that pulley wheels 23 and 25 are located so that the band contacts the periphery of wheel 10 over an arc of the order of 270°. This leaves a portion of the wheel available for introducing the rubber stock and the wire, and for removing the finished product.

The rim or peripheral portion 36 of the molding wheel is made so that it can be heated to a desired temperature, and so as to provide cavities of the desired contour. As shown in Figure 6 a series of parallel molding cavities can be formed by machining the main rim of the wheel to receive a series of rings 37, 38, 39 and 40. In the final assembly these rings can be permanently attached to the body of the wheel, as by welding, or they may be made replaceable by utilizing clamping screws 41 or like clamping devices for retaining the rings in place. The rings in this instance are proportioned to form a series of laterally spaced grooves or molding cavities 42, with a series of spaced teeth 43 within each cavity. (Figures 13 and 14). It is desirable to have adjacent teeth connected by a shallow rib 44, and to have the ends of the teeth grooved as indicated at 45 to seat the wire 12.

Heating of the rim may be by use of electrical elements, but in the construction illustrated it is carried out by steam. Thus the rim of the wheel is shown provided with a steam chamber or cavity 46 (Figure 6) which is connected at spaced points with radial steam pipes 47. These pipes connect with the hub 48 and duct 50 of the wheel and communicate with the steam supply pipe 49. This pipe can connect to a suitable source of steam through a pressure regulator 51. The steam chamber in the wheel is also connected with condensate exhaust pipes 52 which lead to the opposite end of the wheel hub 48, whereby condensate is discharged through the hub duct 53. (Figure 6). In order to control removal of the condensate at periodic intervals, each pipe 52 is provided with a valve 54 having an operating stem 56 adapted to be depressed to permit flow of condensate. Mounted upon a lever 55 there is a cam wheel 57 (Figure 9) located within the path of movement of each operating stem 56, so that as the valves pass this wheel they are momentarily operated to permit discharge of condensate. Each valve is operated when its associated pipe connects with a portion of the wheel rim which is lowermost. Lever 55 is pivotally attached to a bearing block 21 of the frame and can be adjusted by screw 58.

The drive means for the main molding wheel and the associated pulley wheel can vary in construction, but preferably it is capable of operating at two speeds. The drive means illustrated employs two electric motors 59 and 60. Motor 59 has a belt drive to shaft 61, which extends from the speed reduction gearing 62. Pinion 63 of this gearing engages a gear 64, which is attached to the shaft of the molding wheel 10. Motor 60 is belted to a separate speed reduction gearing 66, which has a shaft 67 aligned with shaft 61, and adapted to be connected to the same by the manual releasable clutch 68. Motor 59 and its associated drive elements can be adapted to drive the molding wheel at a speed suitable for use in setting up the machine, such as about ¼ revolution per minute, and motor 60 can be used to secure an operating speed such as about 0.1 revolution per minute. When using motor 60, motor 59 has its belt drive disconnected, and clutch 68 is engaged.

During the molding of a continuous insulating sheath of the type to be presently described, wire 12 must be accurately seated upon the ends of the teeth 43 substantially as shown in Figures 13 and 14. Generally the wire is of substantial dimensions, such as for example from ¼ to ⅜ of an inch in diameter, and therefore it is relatively stiff and resists bending. Oscillating device 13 facilitates proper positioning of this wire upon the ends of teeth 43. It consists of a roller 71 provided with grooves 72, to accommodate a plurality of wires 12. This roller is rotatably mounted upon a shaft, the ends of which have pivotal connections 73 with the oscillating arms 74, 76. The upper ends of these arms are cross connected by links 77. The lower ends have pivotal connections 78 with a bracket 79 which in turn is attached to the frame of the machine. Arm 74 has a lateral extension 81 which is attached to the upper end of a rod 82. The lower end of rod 82 has a pivotal connection 83 with the lever 84 (Figure 1B). One end of this lever has a pivotal mounting 86 to the frame of the machine, and the other end has a pivotal connection 87 with the link 88. The lower end of link 88 is journaled to a crank arm 89, driven at a proper rate by the motor 91. While the rate of oscillation can vary, in practice good results have been secured with about 2 to 4 oscillations per minute with the molding wheel rotating at about 0.1 R. P. M. As shown in Figures 1B and 3 the wire 12 is applied to the machine under tension, and is caused to pass under roller 71 in engagement with one of the grooves 72. The amplitude of oscillation can likewise vary, but in practice good results have been secured with an amplitude of about 2 inches, where the roller 71 is disposed about 20 inches from the region where the wire is engaging the teeth 43. This arrangement is suitable for wire ranging from say ¼ to ⅜ of an inch in diameter. With respect to the speed of rotation of the molding wheel (which in the foregoing example was about 0.1 revolution per minute) it should be correlated with the oscillating movement so that after the wire contacts a tooth it is given more than one complete oscillation before it is caused to contact a succeeding tooth. Thus as the wire approaches and is seated upon a tooth 43 it has slight oscillating movement in a lateral direction, which thereby insures proper and accurate seating upon the curved or concave surfaces 45.

As previously mentioned the finished sheath 16 is caused to pass through chilling means 17, which can simply consist of a suitable box provided with means within the same for spraying water upon the sheath. Thereafter the sheath can pass to a suitable slitting mechanism which serves to cut the sheath along its back side, whereby the sheath can be stripped from the inner wire. The wire is then looped over a convenient idler pulley and returned to the machine.

The rubber stock supplied to the machine may vary in cross-sectional contour. One shaping is illustrated in Figure 10. Briefly it is a continuous strip of material generally rectangular in cross-sectional contour, and with a continuous groove 96 extending through one side, the groove being located between the side portions 97. A considerable length of this rubber stock can be kept upon a suitable reel and fed to the machine over the top of the pulley wheel 23 (Figures 1A and 7). In order to properly locate the rubber stock upon the periphery of wheel 23, an arcuate supporting bracket 101 is provided and attached to this bracket are the spacing and guide pins 102. The rubber stock is caused to pass between successive pairs of guide pins whereby it is located in the same vertical plane as its corresponding molding cavity.

In the embodiment described above a special feed means in the form of a nozzle as illustrated in Figures 4 and 5 is utilized for feeding the rubber stock into the molding cavity. This means makes use of a plurality of spaced parallel plates 106, which are carried by the fixed bracket bar 107, and which are adapted to be positioned between adjacent lengths of rubber stock. In addition to such plates, in this instance the nozzle makes use of pivot pins or shafts 108, 109 and 110 which extend through the plates and serve to journal a series of special wheels and rollers. Thus each shaft 108 and 110 carries wheels 111 and the smaller rollers 112. Pin 109 carries the rollers 113. The grouping of these wheels and rollers can be seen from Figure 4, and is the same for the space between each pair of plates 106. Thus each wheel 111 is located between a pair of rollers 112, and rollers 113 are aligned with the rollers 112. All of the small rollers are provided with grooved peripheries. Wheels 111 are formed to extend within the groove 96 of the rubber stock. Rollers 112, 113 engage the end faces of the stock portions 97, and together with wheels 111 they serve to press the stock against the endless metal band 11, which at that time is interposed between the rubber stock and the periphery of the pulley wheel 23. As a result, the stock is urged or crowded toward the molding cavity in the direction of its length, due to the fact that the velocity of the surface of the belt 11, in the zone where the rubber stock is urged against the same, is slightly greater than the rate with which the stock can be supplied to the cavity, thus causing a slight slippage. It is also desirable to have the edge surfaces 106a and 106b of plates 106 curved as illustrated whereby they are normally disposed in close proximity to the metal band 11 and the periphery of the molding wheel.

Figures 11 and 12 illustrate a typical finished sheath. It has an accurately located passage 121 extending longitudinally of the same, which is adapted to receive a trolley wire or cable. The back side of the sheath is slit as indicated at 122, whereby the sheath can be distorted for application to a trolley wire. After such application suitable clamping means can be applied to retain the slot 122 closed during normal use. The other side of the sheath is provided with regularly spaced recesses 123 separated by the gear-like teeth 124. The conducting teeth of a traveling contacting device are adapted to enter recesses 123 for the purpose of making electrical engagement with the trolley wire.

Operation of the machine as a whole can be reviewed as follows: A length of rubber stock is selected, such as the form shown in Figure 10, and of a material which will readily cure under heat and pressure to form a final resilient molded body. In placing the machine in operation, the molding wheel 10 and the associated pulley wheels and the endless metal band 11 are driven at a suitable constant speed, and the rim of the molding wheel is heated to a suitable temperature for curing the rubber stock. The strip 14 of rubber stock is fed into the machine from a reel or roll of the material as previously mentioned, and over the pulley wheel 23 upon the belt 11. In a region adjacent the line of centers between the pulley wheel 23 and the molding wheel 10, the rubber stock enters the feed nozzle between two of the plates 106. Spacing between these plates is sufficient to accommodate the rubber stock, and the spacing likewise conforms to the width of the associated molding cavity. Shortly before the rubber stock enters the molding cavity it is urged against the adjacent surface of belt 11, and as previously described this causes the stock to be urged toward the molding cavity, thus insuring flow of stock into the cavity to completely fill all parts of the same. As the rubber stock contacts the cavity it is heated and softened to facilitate its flow under the pressing effect of the metal band 11 and the forward urging of the stock just described. When the rubber stock flows into the molding cavity the wire 12 is already in place upon the teeth 43, as has been previously described. As the rubber in the cavity progresses with rotation of the molding wheel it is subjected to heat while being held under pressure to cure the same, and heat curing is completed by the time the finished product 16 is removed over the pulley 25 (Figure 1B). At this time the sheath is at an elevated temperature and is subject to possible elongation with resulting inaccuracy in the spacing between the teeth 124. However the sheath is immediately chilled by passing it through the chilling device 17, whereby it is set and no longer subject to possible deformation. From the chilling device 17 the sheath passes to a suitable slitting device as previously mentioned, whereby the back side of the sheath is slit longitudinally and the sheath removed from the inner wire. The wire 12 then passes over a pulley and is returned continuously to the machine.

The modified machine illustrated in Figures 15 to 19 inclusive employs a molding wheel 126 corresponding to the wheel 10 of Figures 1 to 14 inclusive, and which is provided with two pairs of molding cavities, one pair comprising cavities 127, and the second pair the cavities 128. These cavities are formed by the assembly of a series of rings upon the rim of wheel 126. Rings 129 form the ends of this assembly, rings 131 form ridges in the molding cavity, rings 132 divide adjacent cavities, and rings 133 form a separation between the two pairs of cavities. Rings 134 form spaces between adjacent rings. Rings 129 and 133 are provided with relatively accurately machined and cylindrically formed peripheries 136 and 137. A cavity formed in this manner will mold a continuous strip having a groove extending along one side of the same.

The feed nozzle 138 in this instance consists of the two side plates 139, and the intermediate plate 141. These plates are assembled and clamped together by the bolts 142 which are provided with suitable spacers 143. Edge portions 144 and 145 of the plates are curved and contoured substantially as illustrated in Figure 15. Thus the surfaces of these edge portions are in close apposition with the adjacent surface of the metal band 11, and the outer peripheral surfaces of the rings 129 and 133.

As a suitable mounting for the nozzle 138, the plates 139 and 141 are provided with aligned openings 146 serving to accommodate a rigid bar 147. This bar is attached to a rigid support, such as a rigid part of the machine frame. Each of the plates 139 is also provided with vertical and horizontal set screws 148 and 149, by means of which the nozzle is adjustably clamped to the bar 147.

As previously explained the adjustment is such that the surfaces of the edge portions 144 and 145 have relatively close apposition to the adjacent surfaces of the band 11 and the peripheries of rings 129 and 133. Thus two spaces or passages are formed by the nozzle for receiving the rubber stock, and each space is confined on its sides by plates 139 and 141, while its upper side is confined by the exterior surface of the band 11, and the lower side by the molding wheel and cavities.

The rubber stock 151 in this instance may have a rectangular cross-sectional contour as illustrated in Figure 18, or if desired it may be circular or oval. In any event the dimensions of this stock are sufficient to provide ample material for filling two cavities simultaneously with a speed of advancement only slightly less than the speed of movement of band 11. Assuming that the rubber stock has a rectangular cross-sectional contour, it occupies a position between the plates 139 and 141 of the nozzle substantially as illustrated in Figure 18, as it initially enters the nozzle. As the stock contacts the molding wheel it is softened by heat, and simultaneously with this softening the rubber is urged by the band 11 into the molding cavities 127 or 128. This is made clear by reference to diagrammatic Figure 19. In the zone 151a there has been some softening of the rubber stock by an increase in its temperature, and the softened rubber stock is flowing into the molding cavity. At 151b the rubber has completely flowed into the molding cavity and is being retained in the cavity by the endless band 11. A banking effect occurs in the region 151a, due to the fact that the dimensions of the rubber stock tend to supply more rubber than is actually needed to fill the cavity. In this region the rubber is being confined by the plates 139 and 141 and is being pressed into engagement with band 11. This bank is desirable in that it secures optimum feeding of the rubber stock with complete filling of the molding cavities.

As shown in Figure 19, supplemental means can be provided for urging the rubber stock against the adjacent surface of the endless band 11, for the purpose of increasing the banking effect. In place of utilizing a plurality of rollers and wheels illustrated in Figures 4 and 5, I provide in this instance a single wheel or roller 152 which is journaled upon the end of a pivoted arm 153. An adjustable tension spring 154 urges the arm 153 in a clockwise direction as viewed in Figure 19, thus urging the roller 152 against the rubber stock and thus urging the rubber stock into frictional engagement with the band 11 in a region in advance of the banking region. For some types of rubber stock tending to flow readily when heated, use of the roller 152 can be omitted. However with other types of rubber stock, difficulty is encountered in securing proper filling of the cavity without the roller 152, and in such instances use of this roller insures the maintenance of proper banking zone 151a, with proper flow of the rubber into the molding cavity to fill all portions of the same.

It will be evident from the foregoing that my machine can be employed to continuously mold a variety of products, in addition to the insulating sheath described with respect to Figures 1 to 14 inclusive. The molding cavities can be formed in accordance with the particular product desired to form, for example such products as rubber edging, window weather stripping, and the like.

I claim:

1. In a machine for continuously molding a material like rubber, a molding wheel adapted to be rotated at a predetermined rate, the wheel being provided with a molding cavity extending about its peripheral portion, a pulley mounted adjacent one side of the molding wheel, a band entrained over said pulley and molding wheel and passing between the peripheries of the pulley and the molding wheel, means for driving the wheel and pulley whereby the band progresses about the pulley, then between the pulley and the wheel and then about the wheel, a feed nozzle disposed in proximity with both the periphery of the wheel and the surface of the band in a region adjacent one side of the line of centers between the pulley and the wheel, said nozzle forming a confined space for receiving a length of rubber stock and for presenting the same under confinement to the cavity, said nozzle including a pair of plates between which the rubber stock is caused to pass, each of said plates having edge portions of the same in close apposition with the surface of the band and the outer periphery of the molding wheel, and means for supplying a length of rubber stock to said nozzle.

2. In a machine for continuously molding a material like rubber, a molding wheel adapted to be rotated at a predetermined rate, the wheel being provided with a continuous molding cavity extending about its peripheral portion, a pulley mounted adjacent one side of the molding wheel, a metal band entrained over said pulley and the molding wheel and passing between the peripheries of the pulley and the molding wheel, means for continuously driving the wheel and pulley whereby the band progresses about the pulley, then between the pulley and the wheel and then about the wheel, a feed nozzle disposed in proximity with both the periphery of the wheel and the surface of the band in a region adjacent one side of the line of centers between the pulley and the wheel, said nozzle forming a confined space for receiving a length of rubber stock and for presenting the same under partial compression to the molding cavity, said nozzle including a pair of substantially parallel plates between which the rubber stock is caused to pass, each of said plates including convergent curved edge portions in close apposition with the surface of the band and the outer periphery of the molding wheel, the spacing between the plates corresponding substantially to the width of said molding cavity, and means for supplying a length of rubber stock to said nozzle.

3. In a machine for continuously molding a material like rubber, a molding wheel adapted to be rotated at a predetermined rate, the wheel being provided with a molding cavity extending about its peripheral portion, a pulley mounted adjacent one side of the molding wheel, a band entrained over said pulley and the molding wheel and passing between the peripheries of the pulley and the molding wheel, the exterior face of that portion of the band which is entrained over the pulley being convex, means for driving the wheel and pulley whereby the band progresses about the pulley, then between the pulley and the wheel and then about the wheel, means for supplying a strip of moldable material for presentation to the molding cavity in a region adjacent the line of centers between the pulley and the wheel, and means located adjacent the point of introduction of the moldable strip into the cavity for urging the strip into frictional engagement with the adjacent convex surface of the band, whereby said strip is urged in the direction of its length toward the wheel and the molding cavity.

4. A machine as in claim 3 in which said last named means includes spaced plates between which the rubber strip is adapted to pass as the strip is urged into frictional engagement with the band.

5. A machine as in claim 3 in which said last named means includes spaced plates between which the rubber strip is adapted to pass, said plates having curved convergent edge portions of the same in close apposition with the exterior convex surface of the band and with the peripheral surface of the molding wheel.

6. In a machine for continuously molding a material like rubber, a molding wheel adapted to be rotated at a predetermined rate, the wheel being provided with a molding cavity extending about its peripheral portion, a pulley wheel mounted adjacent one side of the molding wheel, a band entrained over said pulley and the molding wheel and passing between the peripheries of the pulley and the molding wheel, the exterior surface of that portion of the band which is entrained over the pulley being convex, means for driving the wheel and pulley whereby the band progresses about the pulley, then between the pulley and the wheel and then about the wheel, means for supplying a strip of moldable material for presentation to the molding cavity in a region adjacent the line of centers between the pulley and the wheel, and means located adjacent the point of introduction of the moldable strip into the cavity for urging the strip into frictional engagement with the adjacent convex surface of said band and for guiding the strip into the cavity, said last named means including roller means engaging the strip and urging the same toward the adjacent surface of the band.

BURTIS W. BENBOW.

REFERENCES CITED

The following references are of record in the file of this patent:

UNITED STATES PATENTS

| Number | Name | Date |
| --- | --- | --- |
| 2,166,490 | Gora | July 18, 1939 |
| 2,303,554 | Humphreys | Dec. 1, 1942 |